United States Patent
Yuan et al.

(10) Patent No.: US 12,270,786 B1
(45) Date of Patent: Apr. 8, 2025

(54) METHOD, DEVICE, AND SYSTEM FOR MEASURING PIPELINE CORROSION

(71) Applicant: GUANGDONG UNIVERSITY OF TECHNOLOGY, Guangzhou (CN)

(72) Inventors: Maodan Yuan, Guangzhou (CN); Ruiyu Zhu, Guangzhou (CN); Yongfeng Song, Guangzhou (CN); Xuanrong Ji, Guangzhou (CN); Yan Chen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/977,341

(22) Filed: Dec. 11, 2024

(30) Foreign Application Priority Data

Sep. 4, 2024 (CN) .......................... 202411230613.4

(51) Int. Cl.
*G01N 29/04* (2006.01)
*G01N 17/04* (2006.01)

(52) U.S. Cl.
CPC .......... *G01N 29/041* (2013.01); *G01N 17/04* (2013.01); *G01N 2291/0234* (2013.01); *G01N 2291/0427* (2013.01)

(58) Field of Classification Search
CPC ................. G01N 29/041; G01N 17/04; G01N 2291/0234; G01N 2291/0427
USPC ......................................................... 73/602
See application file for complete search history.

(56) References Cited

U.S. PATENT DOCUMENTS

| | | | | |
|---|---|---|---|---|
| 5,362,962 A | * | 11/1994 | Barborak | G01N 21/952 250/234 |
| 6,644,848 B1 | * | 11/2003 | Clayton | E21B 17/01 73/61.62 |
| 6,995,677 B2 | * | 2/2006 | Aronstam | E21B 47/006 340/854.6 |
| 7,541,817 B2 | * | 6/2009 | Nielsen | G01N 17/02 324/71.2 |
| 9,128,019 B2 | * | 9/2015 | Wayman | G01N 17/02 |
| 10,330,587 B2 | * | 6/2019 | Kumar | G01N 17/02 |
| 11,891,889 B2 | * | 2/2024 | Liu | E21B 44/00 |
| 2017/0059473 A1 | | 3/2017 | Kumar et al. | |

(Continued)

FOREIGN PATENT DOCUMENTS

CN 107632068 A 1/2018
CN 113834873 A 12/2021

*Primary Examiner* — Jacques M Saint Surin

(57) ABSTRACT

A method for measuring pipeline corrosion includes: obtaining a material property of a to-be-detected pipeline, and calculating a theoretical dispersion curve of the to-be-detected pipeline based on the material property; determining a theoretical frequency-thickness product and a theoretical frequency of a zero-group-velocity (ZGV) Lamb wave mode from the theoretical dispersion curve; obtaining a target excitation signal corresponding to the theoretical frequency; sending the target excitation signal to the to-be-detected pipeline and receiving a target waveform, where the target waveform is obtained by reflecting the target excitation signal through the to-be-detected pipeline; determining an actual frequency of the ZGV Lamb wave mode from the target waveform; and calculating corrosion of the to-be-detected pipeline based on the theoretical frequency-thickness product and the actual frequency of the ZGV Lamb wave mode.

10 Claims, 14 Drawing Sheets

(56) References Cited

U.S. PATENT DOCUMENTS

2022/0049996 A1 2/2022 Jiao et al.
2024/0255414 A1 8/2024 Shao et al.

* cited by examiner

METHOD, DEVICE, AND SYSTEM FOR MEASURING PIPELINE CORROSION

CROSS-REFERENCE TO RELATED APPLICATIONS

This application claims priority to Chinese Patent Application No. 202411230613.4 with a filing date of Sep. 4, 2024. The content of the aforementioned application, including any intervening amendments thereto, is incorporated herein by reference.

TECHNICAL FIELD

The present disclosure relates to the technical field of pipelines, and in particular, to a method, device, and system for measuring pipeline corrosion.

BACKGROUND

Non-renewable energy sources such as oil and natural gas play an important role in energy system and are essential for industrial production. In order to efficiently and safely utilize these energy sources, it is necessary to establish a complete transportation process. Oil and gas pipeline transportation has been widely used due to its low cost and high efficiency.

As the service life increases, oil and gas pipelines are exposed to erosion environments of mixed media such as petroleum gas and impurity particles for a long time, resulting in varying degrees of erosion damage to an inner wall of the pipeline. This erosion corrosion effect may cause a wall of the pipeline to become thinner or crack, increasing a risk of pipeline rupture or leakage. However, the pipeline leakage may lead to an explosion, a fire, or other dangerous situations, posing a serious threat to personnel and property safety. Therefore, how to effectively and conveniently detect corrosion thicknesses of the oil and gas pipelines has become a technical problem to be solved.

SUMMARY OF PRESENT INVENTION

The present disclosure provides a method, device, and system for measuring pipeline corrosion, which are used to measure pipeline corrosion.

In one aspect, the present disclosure provides a method for measuring pipeline corrosion, including:
obtaining a material property of a to-be-detected pipeline, and calculating a theoretical dispersion curve of the to-be-detected pipeline based on the material property;
determining a theoretical frequency-thickness product and a theoretical frequency of a zero-group-velocity (ZGV) Lamb wave mode from the theoretical dispersion curve;
obtaining a target excitation signal corresponding to the theoretical frequency;
sending the target excitation signal to the to-be-detected pipeline and receiving a target waveform, where the target waveform is obtained by reflecting the target excitation signal through the to-be-detected pipeline;
determining an actual frequency of the ZGV Lamb wave mode from the target waveform; and
calculating corrosion of the to-be-detected pipeline based on the theoretical frequency-thickness product and the actual frequency of the ZGV Lamb wave mode.

Optionally, the sending the target excitation signal to the to-be-detected pipeline and receiving a target waveform specifically includes:
using an element of a linear phased array probe to send the target excitation signal to the to-be-detected pipeline and receive the target waveform, where
the linear phased array probe is equipped with a plurality of elements, and a quantity of target waveforms is consistent with a quantity of the elements.

Optionally, the determining an actual frequency of the ZGV Lamb wave mode from the target waveform specifically includes:
determining the actual frequency of the ZGV Lamb wave mode from each group of target waveforms to obtain a plurality of groups of formant center frequencies of the ZGV Lamb wave mode.

Optionally, the calculating corrosion of the to-be-detected pipeline based on the theoretical frequency-thickness product and the actual frequency of the ZGV Lamb wave mode specifically includes:
calculating a thickness based on each of the groups of formant center frequencies of the ZGV Lamb wave mode and the theoretical frequency-thickness product to obtain a plurality of groups of thickness values; and
fitting the groups of thickness values to obtain the corrosion thickness of the to-be-detected pipeline.

Optionally, a calculation formula of the thickness is as follows:

$$d_e = \frac{f_t d_t}{f_e}$$

where $f_t d_t$ represents the theoretical frequency-thickness product, $f_e$ represents the actual frequency of the ZGV Lamb wave mode, and $d_e$ represents the thickness value.

In another aspect, the present disclosure provides a device for measuring pipeline corrosion, including:
a first obtaining module configured to obtain a material property of a to-be-detected pipeline, and calculate a theoretical dispersion curve of the to-be-detected pipeline based on the material property;
a first determining module configured to determine a theoretical frequency-thickness product and a theoretical frequency of a ZGV Lamb wave mode from the theoretical dispersion curve;
a second obtaining module configured to obtain a target excitation signal corresponding to the theoretical frequency;
an excitation module configured to send the target excitation signal to the to-be-detected pipeline and receive a target waveform, where the target waveform is obtained by reflecting the target excitation signal through the to-be-detected pipeline;
a second determining module configured to determine an actual frequency of the ZGV Lamb wave mode from the target waveform; and
a calculation module configured to calculate corrosion of the to-be-detected pipeline based on the theoretical frequency-thickness product and the actual frequency of the ZGV Lamb wave mode.

Optionally, the excitation module is specifically configured to use an element of a linear phased array probe to send the target excitation signal to the to-be-detected pipeline and receive the target waveform, where the linear phased array probe is equipped with a plurality of elements, and a quantity of target waveforms is consistent with a quantity of the elements.

Optionally, the second determining module is specifically configured to determine the actual frequency of the ZGV Lamb wave mode from each group of target waveforms to obtain a plurality of groups of formant center frequencies of the ZGV Lamb wave mode.

Optionally, the calculation module includes:
a thickness value calculation subunit configured to calculate a thickness based on each of the groups of formant center frequencies of the ZGV Lamb wave mode and the theoretical frequency-thickness product to obtain a plurality of groups of thickness values; and
a fitting subunit configured to fit the groups of thickness values to obtain the corrosion thickness of the to-be-detected pipeline.

In yet another aspect, the present disclosure provides a system for measuring pipeline corrosion, including: a linear phased array probe, a phased array board, and a controller, where the phased array board is connected to the linear phased array probe, and the controller is respectively connected to the phased array board and the linear phased array probe; and the system is configured to perform the above method.

It can be learned from the above technical solutions that the present disclosure has the following advantages:

The present disclosure provides a method for measuring pipeline corrosion. According to the method, a material property of a to-be-detected pipeline is obtained, and a theoretical dispersion curve of the to-be-detected pipeline is calculated based on the material property. A theoretical frequency-thickness product and a theoretical frequency of a ZGV Lamb wave mode are determined from the theoretical dispersion curve. A target excitation signal corresponding to the theoretical frequency is obtained. The target excitation signal is sent to the to-be-detected pipeline, and a target waveform is received. The target waveform is obtained by reflecting the target excitation signal through the to-be-detected pipeline. An actual frequency of the ZGV Lamb wave mode is determined from the target waveform. Corrosion of the to-be-detected pipeline is calculated based on the theoretical frequency-thickness product and the actual frequency of the ZGV Lamb wave mode.

The present disclosure obtains the material property of the to-be-detected pipeline, and calculates the theoretical dispersion curve of the to-be-detected pipeline based on the material property. In this way, the theoretical dispersion curve of the to-be-detected pipeline is obtained, and technical basic support is provided for determining an excitation signal. The theoretical frequency-thickness product and the theoretical frequency of the ZGV Lamb wave mode are determined from the theoretical dispersion curve. In this way, the theoretical frequency-thickness product and the theoretical frequency are determined. The target excitation signal corresponding to the theoretical frequency is obtained. In this way, the target excitation signal is determined, such that in an actual measurement, the ZGV Lamb wave mode can be effectively excited in the to-be-detected pipeline. The target excitation signal is sent to the to-be-detected pipeline, and the target waveform obtained by reflecting the target excitation signal through the to-be-detected pipeline is received, providing effective data support for calculating the corrosion thickness of the pipeline. The actual frequency of the ZGV Lamb wave mode is determined from the target waveform, and the corrosion thickness of the to-be-detected pipeline is calculated based on the theoretical frequency-thickness product and the actual frequency of the ZGV Lamb wave mode. In this way, the corrosion thickness of the to-be-detected pipeline is effectively calculated. Therefore, in a practical application, a thickness of a to-be-detected pipeline under an erosion environment can be measured in a timely manner, and a corrosion situation of the pipeline can be monitored, thereby improving safety of using the pipeline.

BRIEF DESCRIPTION OF THE DRAWINGS

To describe the technical solutions in the embodiments of the present disclosure or in the prior art more clearly, the accompanying drawings required for describing the embodiments or the prior art will be described briefly below. Apparently, the accompanying drawings in the following description show only some embodiments of the present disclosure, and a person of ordinary skill in the art may still derive other accompanying drawings from these accompanying drawings without creative efforts.

DETAILED DESCRIPTION OF THE EMBODIMENTS

At present, methods for detecting wall thicknesses of oil and gas pipelines mainly include an ultrasonic detection method, an eddy current detection method, a laser detection method, and a radiographic detection method. The eddy current detection method has characteristics of no coupling and fast detection, but it is only suitable for detection of a conductive material and a thin layer material. The laser detection method belongs to non-contact detection, which has fewer limitations and high efficiency, but has a significant challenge in subsequent data processing. The radiographic detection method has a wide detection range and can intuitively display the shape and a type of a defect. However, radiation may cause a significant harm to a human body, and a cost is relatively high. Compared with this, the ultrasonic detection method also has a wide detection range and strong applicability. The ultrasonic detection method is non-destructive and has good directionality in detecting a wall thickness of a pipeline. It has been gradually applied in the field of thickness measurement of metal materials, especially Lamb waves.

Among various types of Lamb waves, there is a special mode called ZGV Lamb wave mode. A group velocity of a ZGV Lamb wave is zero, indicating that acoustic energy is limited to around an excitation region. Therefore, the ZGV Lamb wave has extremely high sensitivity for detecting a local material property, defect, and thickness change. However, at present, application based on a ZGV mode mainly focuses on local stress detection, and there is relatively little research on a local thickness change.

As can be seen from the above, most existing measurement techniques rely on an amplitude characteristic of a received signal. However, an amplitude of the signal is usually affected by external parameters (such as a coating and a corrosion patch), and cannot accurately represent a wall thickness loss, making it difficult to perform measurement. Therefore, how to effectively and conveniently detect the wall thickness of the pipeline has become a technical problem waiting to be solved.

The embodiments of the present disclosure provide a method, device, and system for measuring pipeline corrosion, which are used to measure pipeline corrosion.

In order to make the objectives, features, and advantages of the present disclosure more obvious and easier to understand, the technical solutions in the embodiments of the present disclosure will be clearly and completely described below with reference to the accompanying drawings in the embodiments of the present disclosure. Obviously, the described embodiments are only some rather than all of the embodiments of the present disclosure. All other embodiments obtained by a person of ordinary skill in the art based on the embodiments of the present disclosure without creative efforts shall fall within the protection scope of the present disclosure.

Figure 1:
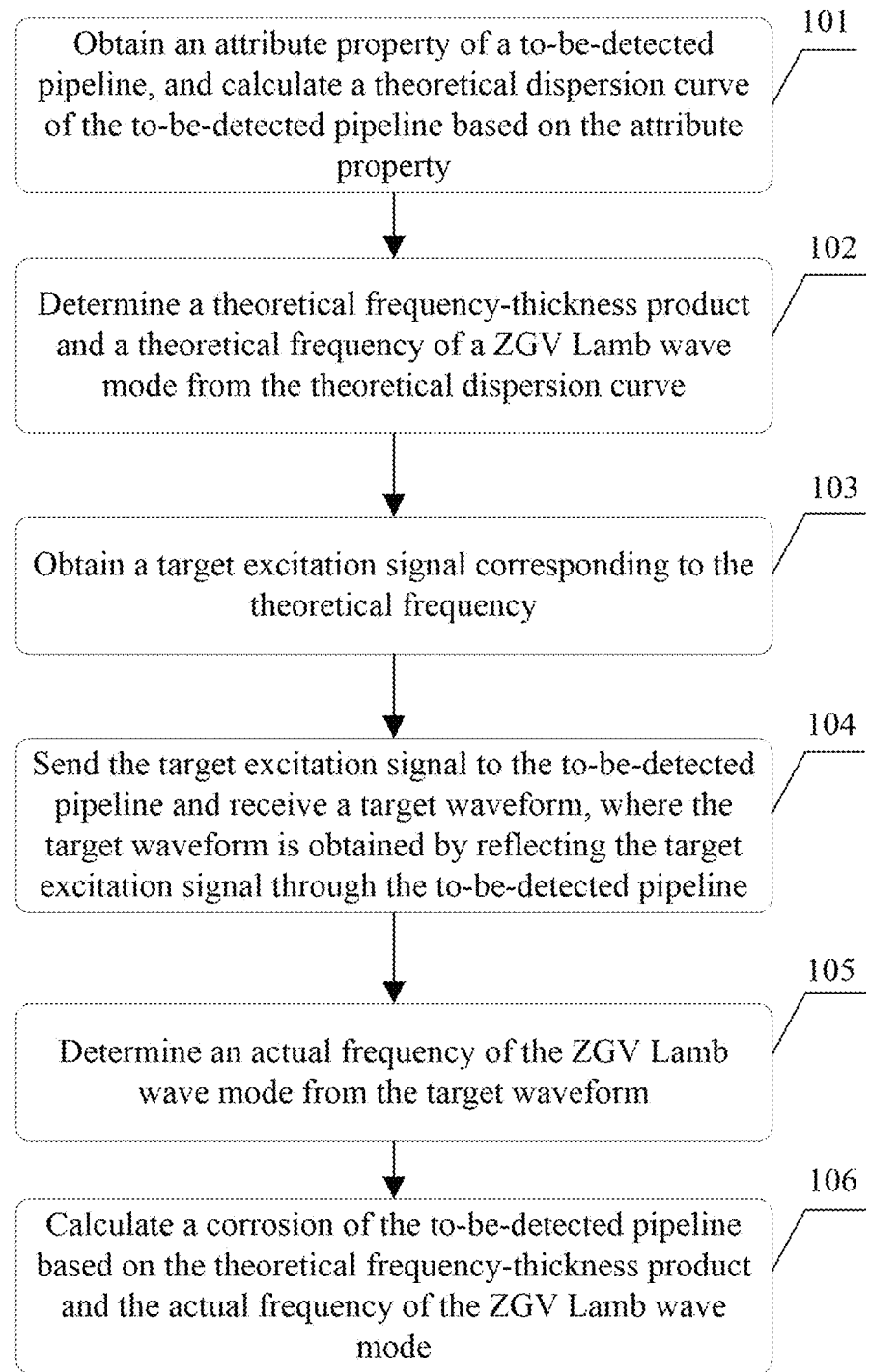
FIG. 1 is a flowchart showing a method for measuring pipeline corrosion according to an embodiment of the present disclosure.

Referring to FIG. 1, the present disclosure provides a method for measuring pipeline corrosion, including the following steps:

In 101, a material property of a to-be-detected pipeline is obtained, and a theoretical dispersion curve of the to-be-detected pipeline is calculated based on the material property.

It should be noted that this embodiment uses a ZGV Lamb wave mode to measure corrosion of the pipeline. Effective excitation of a ZGV mode is closely related to a selected excitation signal, and an excitation frequency of the excitation signal mainly depends on a thickness and a material characteristic of the pipeline. During pipeline detection, only a specific position on a cross-section of the pipeline is scanned. Therefore, this embodiment obtains a dispersion curve of a corresponding plate-like structure through solving, and determines the excitation frequency of the excitation signal based on a frequency of the ZGV Lamb wave mode, to effectively excite the ZGV mode in the to-be-detected pipeline.

The material property of the to-be-detected pipeline includes a pipeline thickness and a linear elastic constant. The linear elastic constant includes a material density, a Young's modulus, a Poisson's ratio, and the like. This embodiment constructs a plate-like structure model by using COMSOL Multiphysics software based on the material property of the to-be-detected pipeline, sets a corresponding boundary condition, research type, and scanning parameter, and runs the plate-like structure model to obtain the corresponding theoretical dispersion curve.

The to-be-detected pipeline can be determined based on an actual detection requirement. The present disclosure provides description by using an example in which a pipeline structure is a 3 mm thick 6061 aluminum pipeline.

A calculation principle of the theoretical dispersion curve is as follows:

A Lamb wave is a guided wave formed after an ultrasonic bulk wave is reflected and superposed for a plurality of times on upper and lower surfaces inside a thin plate and then experiences complex mutual interference and geometric diffusion. It is named after Mr. Lamb's study on a free-boundary thin plate.

The Lamb wave has multimodal and dispersive propagation characteristics. A dispersion characteristic of an elastic wave in the free-boundary thin plate can be solved by using a Rayleigh-Lamb equation:

For a symmetric mode (S):

$$\frac{\tan(hq)}{\tan(hp)} + \frac{4k^2 pq}{(q^2 - k^2)} = 0 \tag{1}$$

For an antisymmetric mode (A):

$$\frac{\tan(hp)}{\tan(hq)} + \frac{4k^2 pq}{(q^2 - k^2)} = 0 \tag{2}$$

where, h represents half a thickness of the plate, k represents a quantity of waves, p and q represent propagation constants, and the following formulas are satisfied:

$$p^2 + k^2 = \frac{\omega^2}{C_L} \tag{3}$$

$$q^2 + k^2 = \frac{\omega^2}{C_s} \tag{4}$$

where, $\omega$ represents an angular frequency, and $C_L$ and $C_S$ respectively represent a longitudinal wave velocity and a transverse wave velocity in the plate. By solving the above equations (1) and (2), a dispersion curve of a 3 mm thick 6061 aluminum plate can be obtained, as shown in FIG. 2.

In 102, a theoretical frequency-thickness product and a theoretical frequency of the ZGV Lamb wave mode are determined from the theoretical dispersion curve.

It should be noted that the ZGV Lamb wave mode is a S1-ZGV mode with a group velocity being 0.

Figure 2:
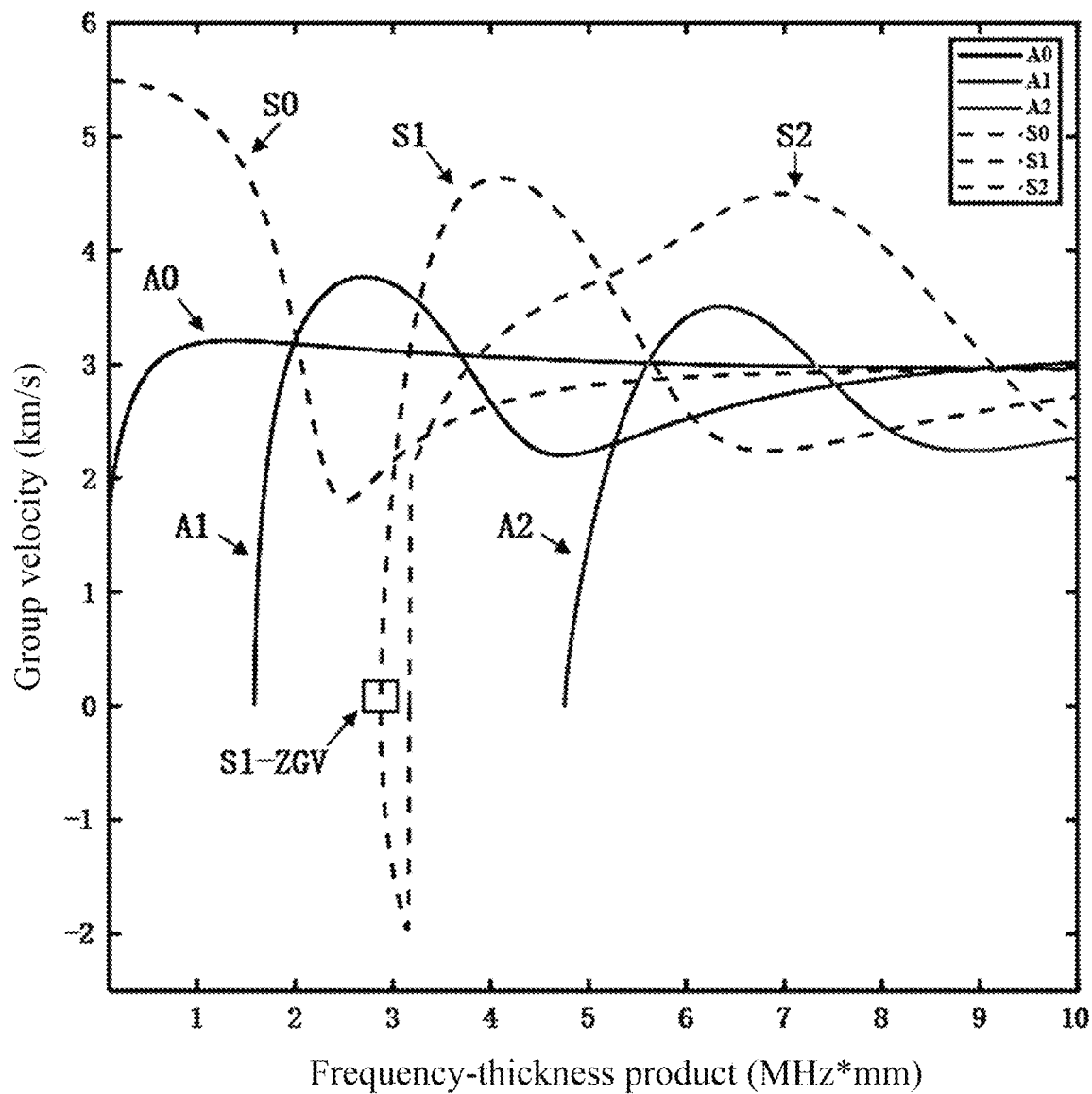
FIG. 2 shows a dispersion curve of a 6061 aluminum plate according to an embodiment of the present disclosure.

The theoretical dispersion curve obtained in the step 101 is shown in FIG. 2. The S1-ZGV mode with a group velocity being 0 is produced through interaction between a forward wave of an S1 mode and a backward wave of an S2 mode. Due to the interaction between the forward wave and the backward wave, acoustic energy is confined near an excitation point. In the figure, a frequency-thickness product of the S1-ZGV mode within a black box is 2.877 MHz*mm. Therefore, a theoretical frequency of the S1-ZGV mode is 0.959 MHz.

In 103, a target excitation signal corresponding to the theoretical frequency is obtained.

Figure 5:
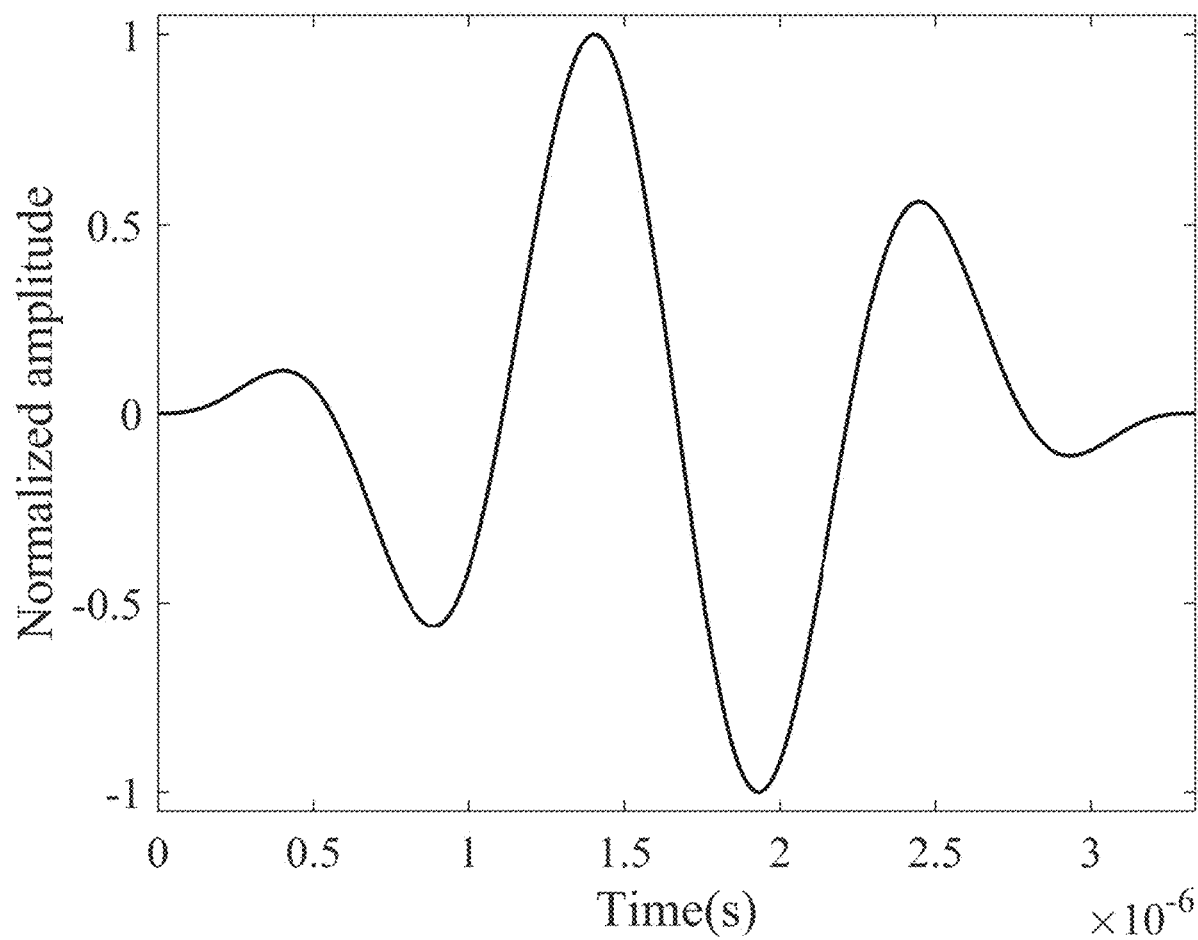
FIG. 5 shows a 900 KHz time domain of an excitation signal according to another embodiment of the present disclosure.
Figure 6:
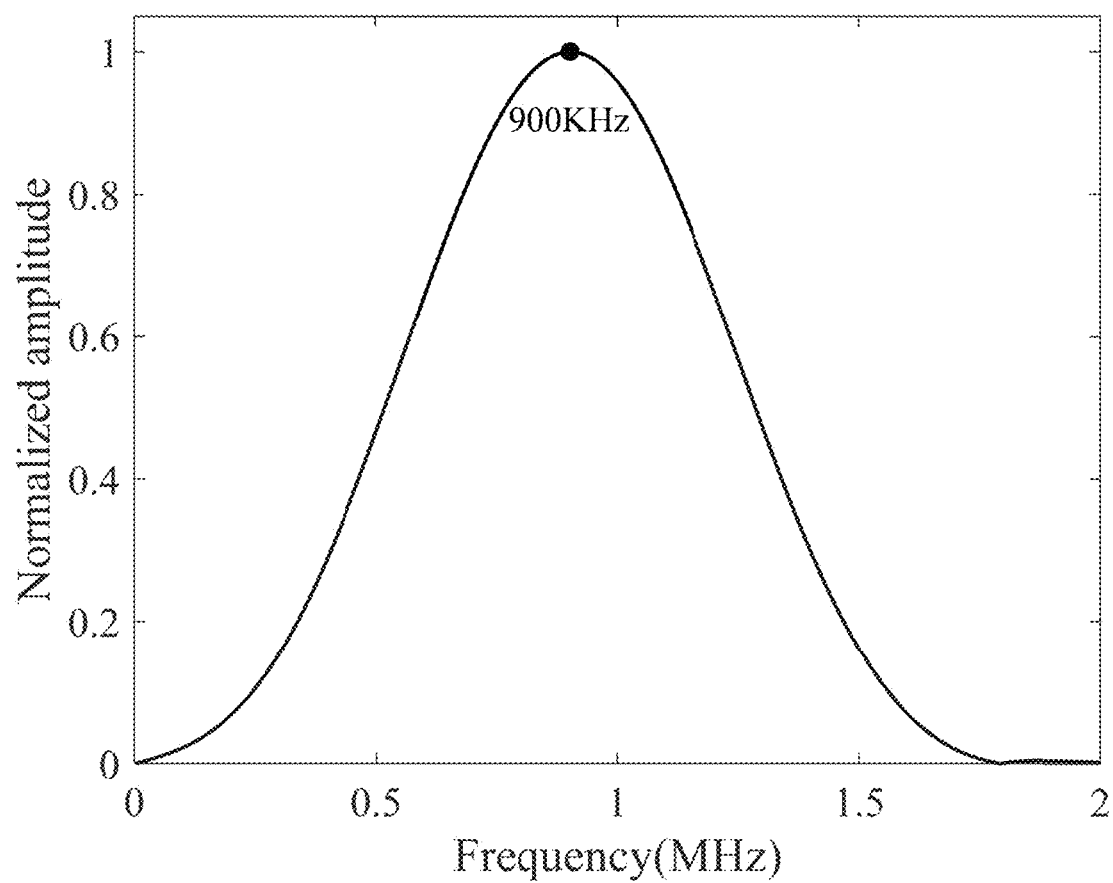
FIG. 6 shows a 900 KHz frequency domain of an excitation signal according to another embodiment of the present disclosure.

It should be noted that the target excitation signal is used to excite the S1-ZGV mode in the to-be-detected pipeline, in order to effectively measure the corrosion thickness. Effective excitation of the S1-ZGV mode is closely related to a selected excitation signal. In the step 102, it can be concluded that the theoretical frequency of the S1-ZGV mode is 0.959 MHz. However, in order to increase an amplitude of the S1-ZGV mode and better identify the S1-ZGV mode, the target excitation signal in this embodiment is preferably a sinusoidal signal that is modulated by a three-period Hanning window and has a center frequency of 0.9 MHz, so as to effectively cover an S1-ZGV frequency with a wide excitation bandwidth. In this way, the S1-ZGV mode can be excited more effectively. A time domain and a frequency-domain representation of the excitation signal are respectively shown in FIG. 5 and FIG. 6.

In order to ensure that the target excitation signal can effectively excite the S1-ZGV mode, this step verifies existence of the S1-ZGV mode in a complete plate-like structure. Verification steps are as follows:

In S1, two-dimensional finite element simulation is performed on the to-be-detected pipeline to obtain a two-dimensional finite element model.

It should be noted that in this embodiment, Abaqus/Explicit CAE software is used to perform the two-dimensional finite element simulation on the to-be-detected pipeline to obtain the corresponding two-dimensional finite element model.

Figure 4:
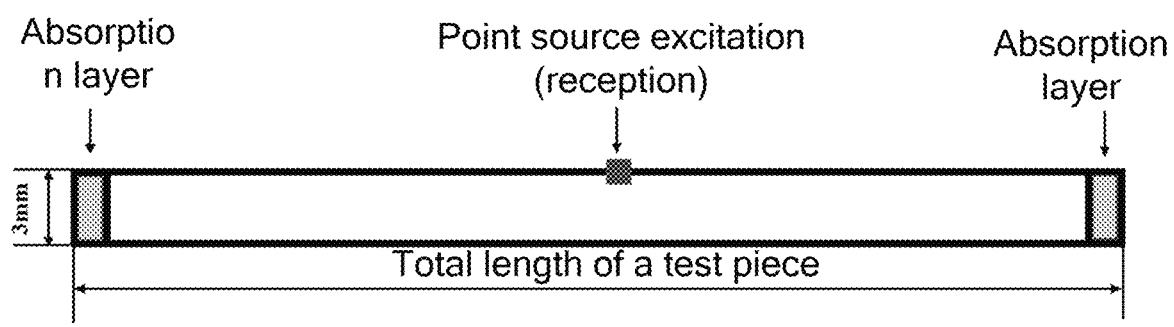
FIG. 4 shows a two-dimensional finite element model according to another embodiment of the present disclosure.

For example, the pipeline structure is the 3 mm thick 6061 aluminum pipeline. In this embodiment, the two-dimensional finite element simulation is performed on a complete and defect-free 3 mm thick 6061 aluminum plate. A plate-like structure with a total length of 100 mm and a thickness of 3 mm is created by using a two-dimensional component module provided by the Abaqus/Explicit CAE software. Moreover, an absorption layer is disposed at two ends of the aluminum plate to avoid boundary reflection at the two ends of the aluminum plate and eliminate an existing reflected signal as much as possible. The constructed two-dimensional finite element model is shown in FIG. 4.

In this embodiment, an optimized detection model with a function containing only two variables is established to obtain a two-dimensional finite element model of a thin-walled pipeline (in other words, a two-dimensional finite element model is constructed for the thin plate). This simplifies the two-dimensional finite element model of the to-be-detected pipeline, reduces a solving dimension, and better conforms to an actual detection situation.

In S2, the target excitation signal is sent to a preset point source position located on the two-dimensional finite element model, and a waveform reflected from the point source position is received.

It should be noted that the point source position is set on the two-dimensional finite element model, and at the point source position, the excitation signal is sent and the waveform obtained by reflecting the excitation signal through the two-dimensional finite element model is received. As shown in FIG. 4, both a receiving point and the excitation point are a same point. In this embodiment, point source excitation is used to save simulation time and reduce a computing power demand.

In S3, an actual frequency of the waveform is calculated.

It should be noted that in this embodiment, corresponding data processing is performed on the waveform received at the point source position to obtain the actual frequency.

The step S3 specifically includes the following substeps:

In S31, a sound velocity of a packet wave of the waveform is calculated, and a resonance wave in the waveform is determined based on the sound velocity of the wave packet.

Figure 7:
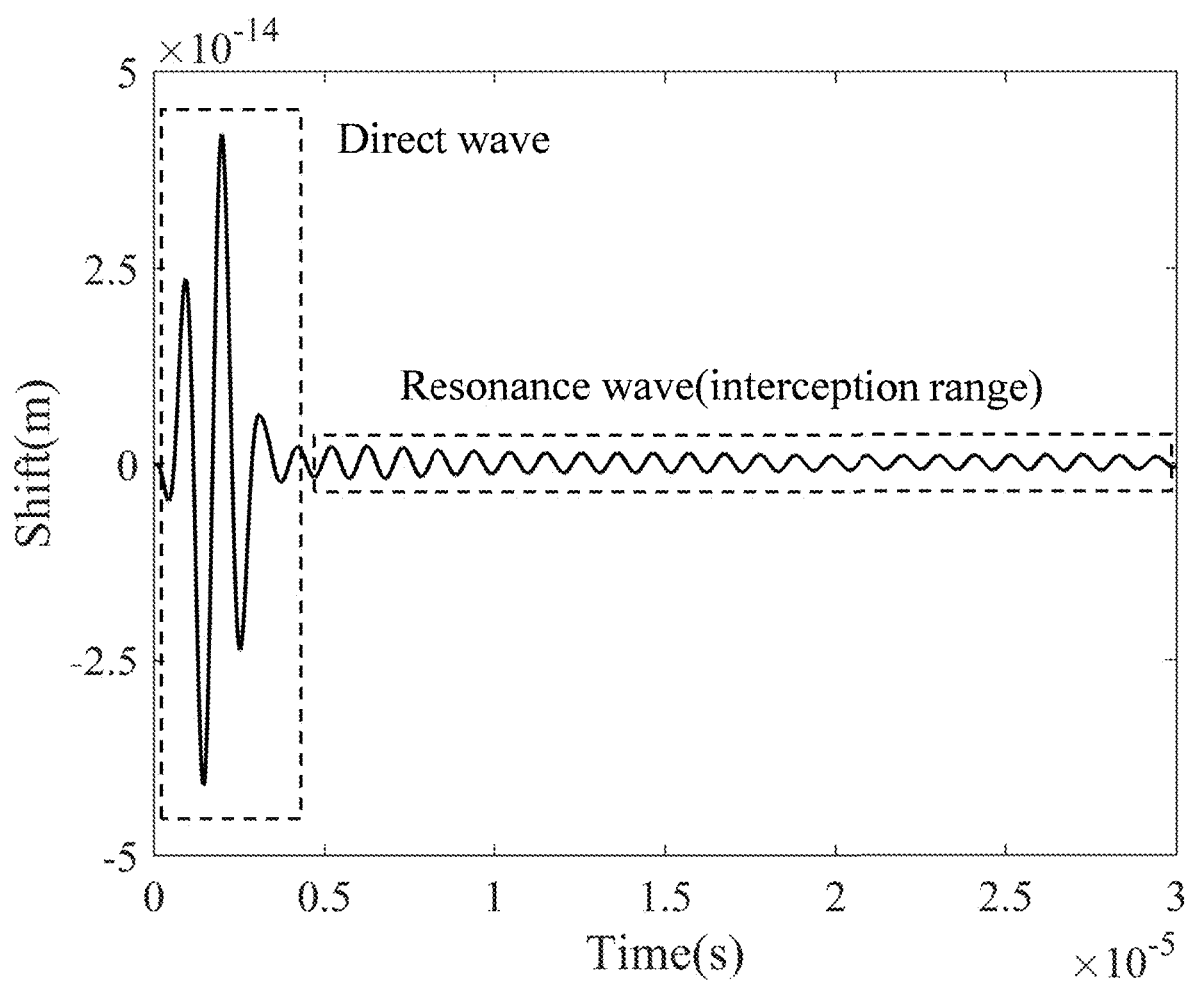
FIG. 7 shows a waveform of a received signal according to another embodiment of the present disclosure.

It should be noted that the sound velocity of the packet wave of the waveform is calculated, such that a mode in the waveform can be determined. The waveform received at the point source position is shown in FIG. 7, and a sound wave type within a dashed box is a direct wave. Based on the sound velocity of the wave packet, it can be determined that a mode of the direct wave is an A0 mode, while a following sound wave type is a resonance wave whose mode is the S1-ZGV mode.

In S32, in the resonance wave, a regional signal within a preset region is intercepted.

It should be noted that the preset region is selected based on an actual situation. In this embodiment, a resonance wave within a range of [4, 30] μs is preferred as the regional signal, and an intercepted region is shown in FIG. 7.

In S33, fast Fourier transform is performed on the regional signal to obtain an actual frequency corresponding to the regional signal.

Figure 8:
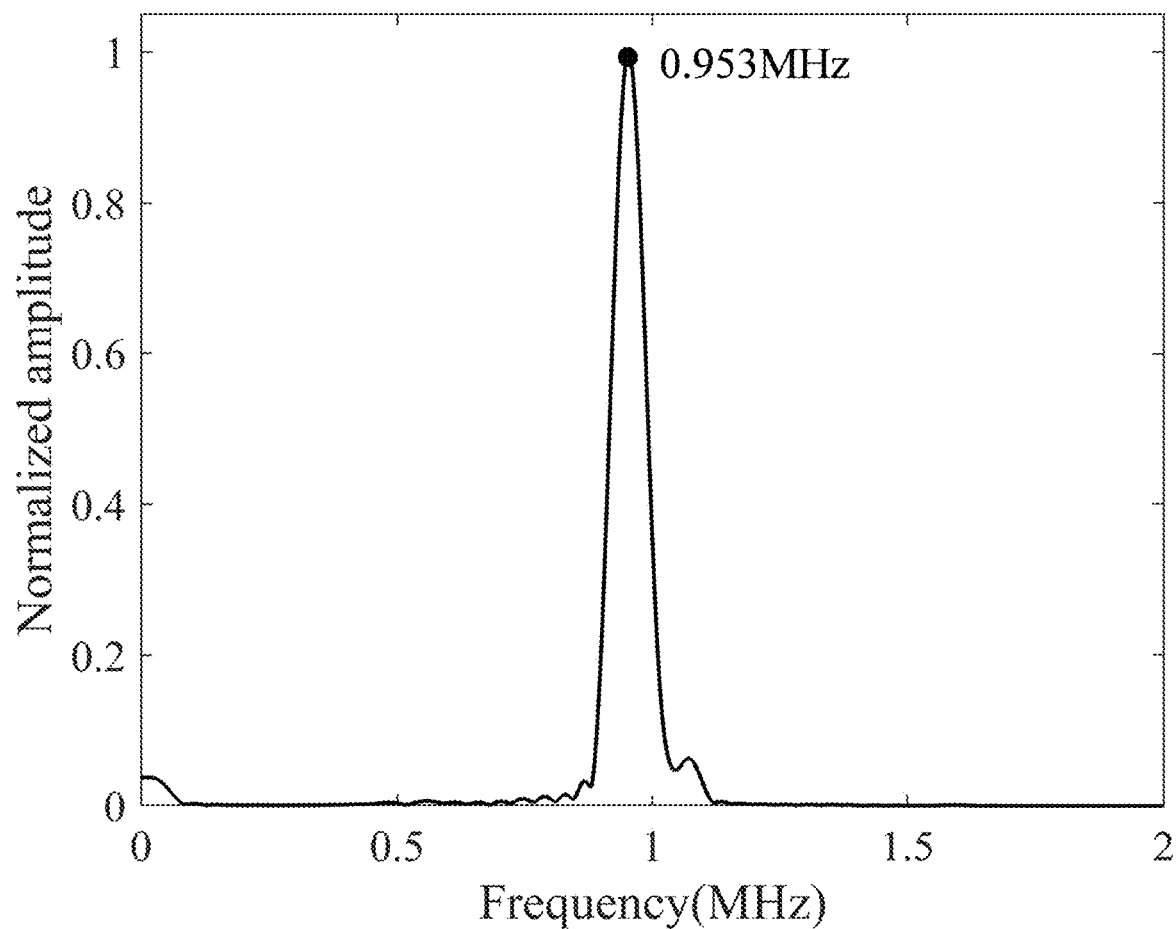
FIG. 8 shows a frequency-domain representation of an S1-ZGV mode according to another embodiment of the present disclosure.

It should be noted that, as shown in FIG. 8, after the fast Fourier transform is performed on an intercepted regional signal, frequency-domain representation analysis of a transformed signal reveals presence of a sharp formant in a frequency domain. The formant is a formant of the S1-ZGV mode. From FIG. 8, it can be seen that a center frequency of the formant is 0.953 MHz, which is close to the theoretical frequency (0.959 MHz) of the S1-ZGV mode. A difference between the center frequency of the formant and the theoretical frequency of the S1-ZGV mode is within an allowable error range, indicating that a resonance wave received at the point source position is in the S1-ZGV mode. This proves that the sinusoidal signal that is modulated by the three-period Hanning window and has the center frequency of 0.9 MHz can be used as the excitation signal to excite the S1-ZGV mode in the two-dimensional finite element model. Therefore, the sinusoidal signal that is modulated by the three-period Hanning window and has the center frequency of 0.9 MHz can be used as an excitation signal for measuring the corrosion thickness of the to-be-detected pipeline, in other words, can be used as the target excitation signal.

In 104, the target excitation signal is sent to the to-be-detected pipeline, and a target waveform is received. The target waveform is obtained by reflecting the target excitation signal through the to-be-detected pipeline.

It should be noted that in this embodiment, the target excitation signal is specifically sent to a to-be-detected region of the to-be-detected pipeline. The to-be-detected region can be selected from the to-be-detected pipeline based on an actual situation.

After the to-be-detected pipeline receives the target excitation signal, the target excitation signal is propagated in the to-be-detected pipeline and reflected by the to-be-detected pipeline to form the target waveform. The target waveform is reflected to a point source that sends the target excitation signal.

In 105, an actual frequency of the ZGV Lamb wave mode is determined from the target waveform.

It should be noted that it can be learned from the step 103 that the target excitation signal is used to excite the S1-ZGV mode in the to-be-detected pipeline. Therefore, the obtained target waveform contains information about the ZGV Lamb wave mode (S1-ZGV mode). Therefore, the actual frequency of the ZGV Lamb wave mode can be obtained by performing the interception and the fast Fourier transform on the target waveform.

In 106, the corrosion thickness of the to-be-detected pipeline is calculated based on the theoretical frequency-thickness product and the actual frequency of the ZGV Lamb wave mode.

It should be noted that a thickness of the to-be-detected pipeline is inverted based on the theoretical frequency-thickness product and the actual frequency of the ZGV Lamb wave mode to obtain the corresponding corrosion thickness.

In this embodiment, the material property of the to-be-detected pipeline is obtained, and the theoretical dispersion curve of the to-be-detected pipeline is calculated based on the material property. In this way, the theoretical dispersion curve of the to-be-detected pipeline is obtained, and technical basic support is provided for determining the excitation signal. The theoretical frequency-thickness product and the theoretical frequency of the ZGV Lamb wave mode are determined from the theoretical dispersion curve. In this way, the theoretical frequency-thickness product and the theoretical frequency are determined. The target excitation signal corresponding to the theoretical frequency is obtained. In this way, the target excitation signal is determined, such that in an actual measurement, the ZGV Lamb wave mode can be effectively excited. The target excitation signal is sent to the to-be-detected pipeline, and the target waveform obtained by reflecting the target excitation signal through the to-be-detected pipeline is received, providing effective data support for calculating the corrosion thickness of the pipeline. The actual frequency of the ZGV Lamb wave mode is determined from the target waveform, and the corrosion thickness of the to-be-detected pipeline is calculated based on the theoretical frequency-thickness product and the actual frequency of the ZGV Lamb wave mode. In this way, the corrosion thickness of the to-be-detected pipeline is effectively calculated. Therefore, in a practical application, a thickness of a to-be-detected pipeline under an erosion environment can be measured in a timely manner, and a corrosion situation of the pipeline can be monitored, thereby improving safety of using the pipeline.

Figure 3:
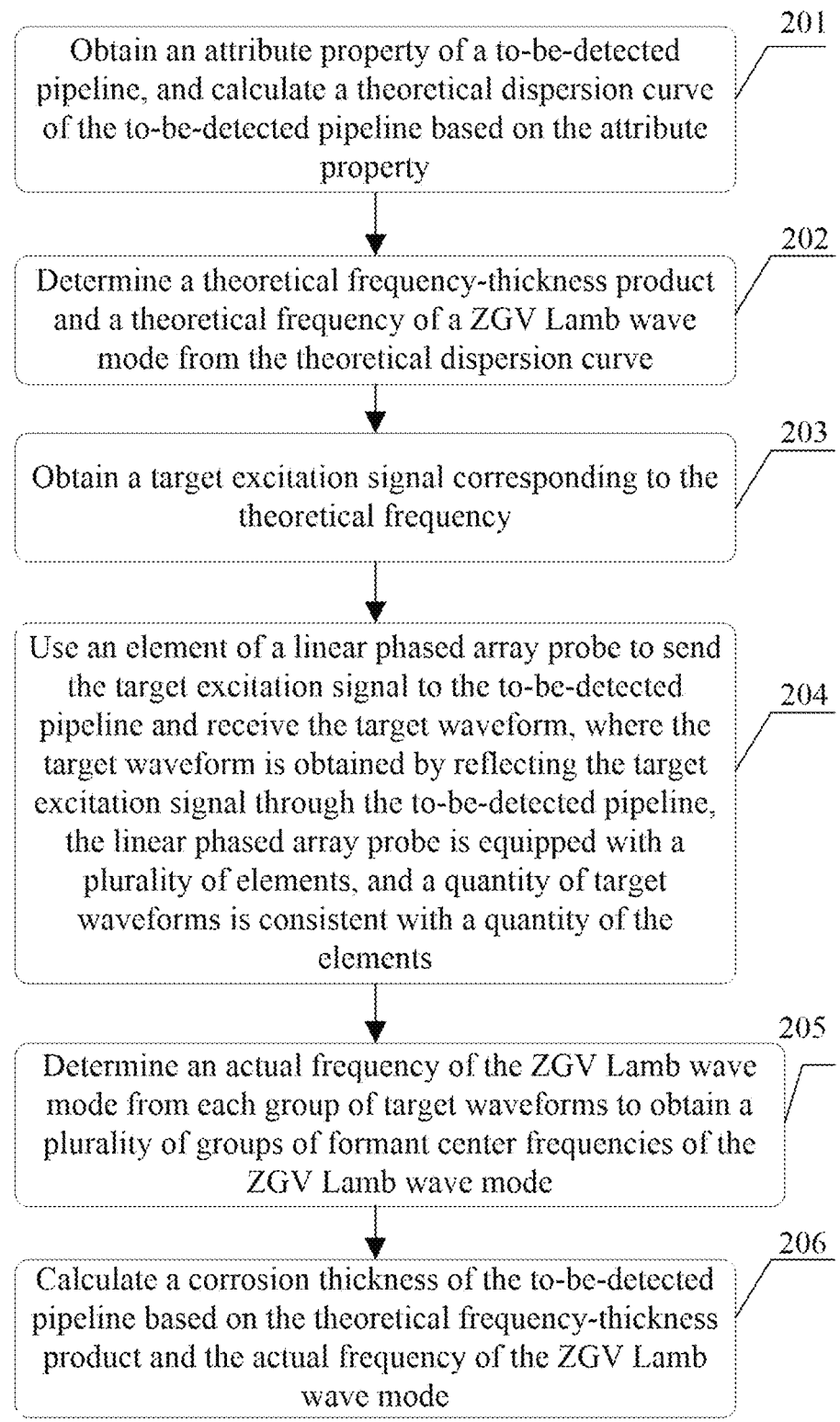
FIG. 3 is a flowchart showing a method for measuring pipeline corrosion according to another embodiment of the present disclosure.

Referring to FIG. 3, an embodiment of the present disclosure provides a method for measuring pipeline corrosion, including the following steps:

In 201, a material property of a to-be-detected pipeline is obtained, and a theoretical dispersion curve of the to-be-detected pipeline is calculated based on the material property.

In 202, a theoretical frequency-thickness product and a theoretical frequency of a ZGV Lamb wave mode are determined from the theoretical dispersion curve.

In 203, a target excitation signal corresponding to the theoretical frequency is obtained.

It should be noted that for the steps 201 to 203, reference may be made to the steps 101 to 103, and details are not described herein again.

In 204, an element of a linear phased array probe is used to send the target excitation signal to the to-be-detected pipeline and receive a target waveform. The target waveform is obtained by reflecting the target excitation signal through the to-be-detected pipeline. The linear phased array probe is equipped with a plurality of elements, and a quantity of target waveforms is consistent with a quantity of the elements.

It should be noted that in this embodiment, a linear phased array probe of a corresponding frequency is selected based on the theoretical frequency. According to the above steps S1 to S5, it can be known that an S1-ZGV mode can be excited through point source excitation. Therefore, in the linear phased array probe used in this embodiment, the elements are disposed and are spaced at a distance. Each element sequentially sends the target excitation signal to the to-be-detected pipeline and receives the target waveform obtained by reflecting the target excitation signal through the to-be-detected pipeline. Therefore, in this step, a quantity of obtained target waveform groups is consistent with the quantity of the elements, achieving multi-point source excitation in some regions of the to-be-detected pipeline.

Specifically, the linear phased array probe has a custom mode and a plane wave imaging mode. After the linear phased array probe is selected, different modes can be selected based on actual needs to perform detection. The following describes each mode.

A first mode is the custom mode. In the custom mode, at least one element may be set to send an excitation signal, and at least one element may also be set to receive a signal. For example, one element is set to emit the excitation signal, and four or eight elements behind the element are set to receive the signal. Then signals received by the four or eight elements are superposed to obtain a target waveform received this time. After that, a second element is set to emit the excitation signal, and four or eight elements behind the second element are set to receive the signal. Then signals received by the four or eight elements are superposed to obtain a signal received for the second time. The above operations are repeated until a last element emits the excitation signal and a plurality of groups of received signals are obtained. It can be understood that superposition of signals of a plurality of elements can enhance a signal amplitude of the S1-ZGV mode.

Subsequently, range interception and fast Fourier transform are sequentially performed on a resonance wave in the obtained received signal to obtain a frequency-domain representation diagram of the resonance wave. In the frequency-domain representation diagram, a formant close to a theoretical frequency of the S1-ZGV mode can be seen, and thickness information of the position can be obtained through solving by using a frequency-thickness product formula of a ZGV mode. Frequency-domain representation information of the S1-ZGV mode at a plurality of positions in the to-be-detected pipeline can be obtained based on signals received by elements at different positions or through scanning by moving the phased array probe. Finally, linear fitting or quadratic curve fitting is performed on obtained thickness values of different positions to obtain a thickness dimension of a corrosion defect in a to-be-detected region of the to-be-detected pipeline through inversion.

In addition, in the custom mode, a phase delay of an emitting-end element can also be controlled to control a deflection angle of a wavefront, further enhancing the excitation of the S1-ZGV mode and better detecting a thickness loss of the to-be-detected pipeline.

A second mode is the plane wave imaging (PWI) mode. In the plane wave imaging mode, a polycrystalline aperture (usually a full aperture of the probe) can be selected. In the second mode, each element is not emitted separately during emission, but basic A-scan data is recorded during reception, with each element receiving one piece of A-scan data, which is different from that in the first mode. A-scan data received by a right-end element is more worthy of attention (assuming that a deflection angle of PWI is deflected to a right end). Therefore, the range interception and the fast Fourier transform are sequentially performed on an A-scan signal of the right-end element to obtain the frequency-domain representation diagram of the resonance wave. Then the thickness information of the position can be obtained. After that, a phased array is moved to perform scanning to obtain a thickness dimension of a corrosion defect in a region of interest can also be obtained through inversion.

In 205, the actual frequency of the ZGV Lamb wave mode is determined from each group of target waveforms to obtain a plurality of formant center frequencies of the ZGV Lamb wave mode.

It should be noted that in actual detection, the same processing is performed on each target waveform to obtain an actual frequency that is of the ZGV Lamb wave mode and corresponds to each element position. Therefore, a quantity of formant center frequencies of the ZGV Lamb wave mode is the same as the quantity of target waveforms. Specific processing steps are as follows: A signal within a preset region is intercepted from the target waveform. The fast Fourier transform is performed on an intercepted signal to obtain a frequency-domain representation diagram of the S1-ZGV mode. The actual frequency of the ZGV Lamb wave mode is determined based on the frequency-domain representation diagram of the S1-ZGV mode.

In 206, corrosion of the to-be-detected pipeline is calculated based on the theoretical frequency-thickness product and the actual frequency of the ZGV Lamb wave mode.

It should be noted that after the actual frequency of the ZGV Lamb wave mode is obtained, thickness inversion is performed based on the theoretical frequency-thickness product and the actual frequency of the ZGV Lamb wave mode to obtain a corresponding thickness value. The step 206 specifically includes the following substeps:

In S61, a thickness is calculated based on each of the groups of formant center frequencies of the ZGV Lamb wave mode and the theoretical frequency-thickness product to obtain a plurality of groups of thickness values.

It should be noted that the thickness inversion is separately preformed on the actual frequency of the ZGV Lamb wave mode and the theoretical frequency-thickness product based on a calculation formula of the thickness to obtain the corresponding thickness value.

In a specific embodiment, the calculation formula of the thickness is as follows:

$$d_e = \frac{f_t d_t}{f_e} \quad (5)$$

In the above calculation formula, $f_t d_t$ represents the theoretical frequency-thickness product, $f_e$ represents the actual frequency of the ZGV Lamb wave mode, and $d_e$ represents the thickness value.

It can be understood that the actual frequency of the ZGV Lamb wave mode and the theoretical frequency-thickness product are substituted into the formula (5) to obtain the corresponding thickness value. However, in this embodiment, the groups of formant center frequencies of the ZGV Lamb wave mode are measured and are separately substituted into the formula (5) to obtain the groups of thickness values.

In S62, the groups of thickness values are fitted to obtain the corrosion thickness of the to-be-detected pipeline.

It should be noted that this implementation can fit a thickness value of each node and perform inversion to obtain thickness information of the corrosion defect. Therefore, when the linear phased array probe detects a corrosion region of the to-be-detected pipeline, a fitted thickness value is the corrosion thickness of the to-be-detected pipeline.

In another preferred embodiment, when it is necessary to view a thickness value of the entire pipeline, the pipeline can be divided into regions by moving a length of the phased array probe, and each region can be scanned sequentially to obtain overall thickness information of the pipeline.

It can be understood that in the aforementioned embodiment, a local thickness of a cross-section of the pipeline is measured, which illustrates a process of using the phased array probe to perform measurement at a position on the pipeline. When it is necessary to view the thickness value of the entire pipeline, a matrix of the phased array probe can be moved to calculate a thickness value of each region in sequence, thereby obtaining an overall thickness value of the pipeline and monitoring the thickness of the entire pipeline.

In order to clearly illustrate an effect of the method for measuring pipeline corrosion provided in the embodiments, the following provides description with reference to simulation application examples.

Figure 9:
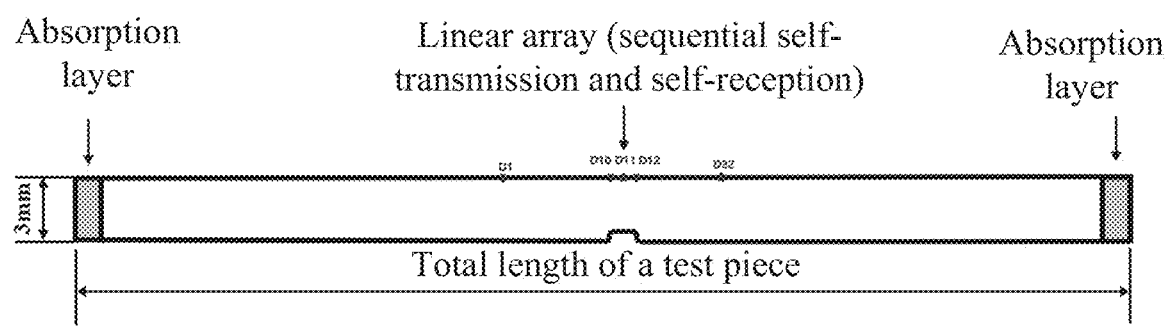
FIG. 9 is a simulation diagram of a two-dimensional structure with a corrosion defect according to another embodiment of the present disclosure.

In a simulation application example, a two-dimensional structure with a corrosion defect is first constructed. The corrosion defect is obtained by removing a grid cell, and the defect is set as a rounded rectangle with a length of 4 mm, a thickness of 0.5 mm, and a rounded corner of 0.2 mm, as shown in FIG. 9. 32 nodes, named D1 to D32, are disposed above the corrosion defect. An excitation signal is a sinusoidal signal that is modulated by a three-period Hanning window and has a center frequency of 0.9 MHz. The 32 nodes sequentially excite and receive a signal (pulse echo). In this simulation application example, a linear array point source is used to simulate excitation of a phased array probe. In the linear array point source, 32 elements are disposed, a spacing between elements is 0.3 mm, and a total length of a linear array is 9.3 mm. The 32 elements send a target excitation signal and receive a target waveform by themselves. Therefore, 32 groups of A-scan signals can be obtained. After the 32 groups of A-scan signals are obtained, signal data of [4,30] μs is intercepted from each A-scan signal for fast Fourier transform. Finally, a frequency-domain representation diagram of an S1-ZGV mode at each point source position is obtained.

Figure 10:
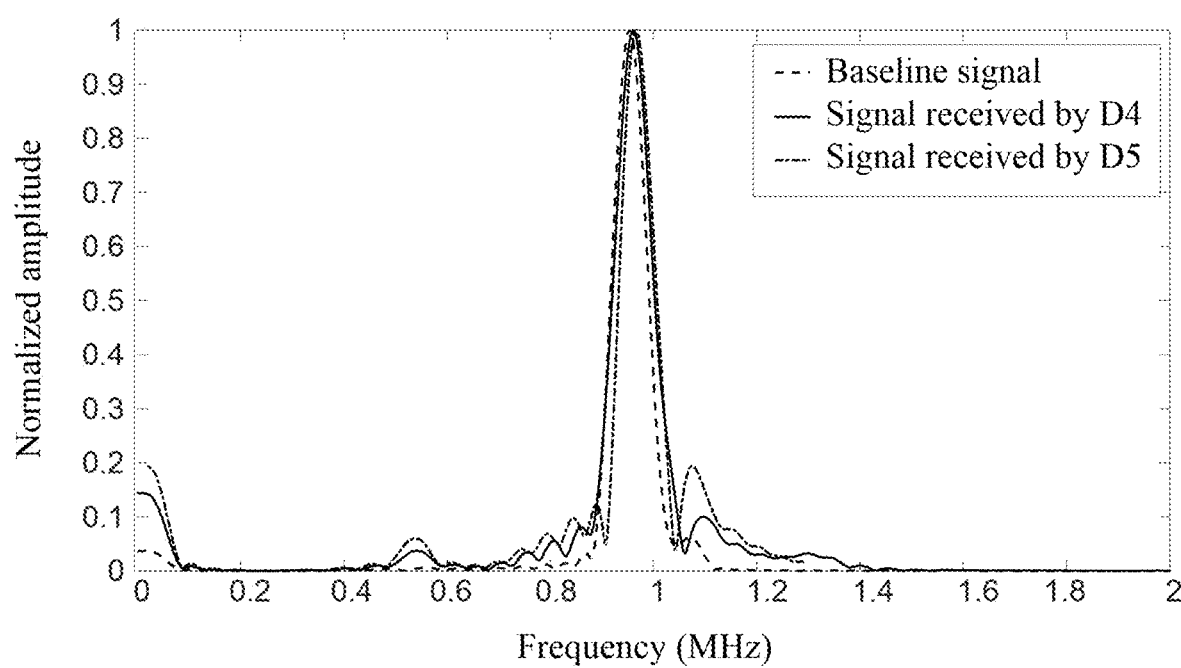
FIG. 10 shows frequency-domain representations of signals received by nodes D4 and D5 according to another embodiment of the present disclosure.

Nodes D4 and D5 are used as an example. FIG. 10 compares frequency-domain representations of signals received by the node D4, the node D5, and a complete model. In the figure, it can be seen that due to the corrosion defect, a formant moves right, and a right frequency shift of the formant becomes more pronounced as the node approaches the defect, and so on. A formant frequency of the node D4 is 0.9605 MHz, and a formant frequency of the node D5 is 0.965 MHz. A theoretical frequency-thickness product of the S1-ZGV mode is 2.877 MHz*mm. Therefore, a thickness value can be solved according to the equation (5): $d_{e4}=2.9754$ mm, and $d_{e5}=2.9608$ mm.

Figure 11:
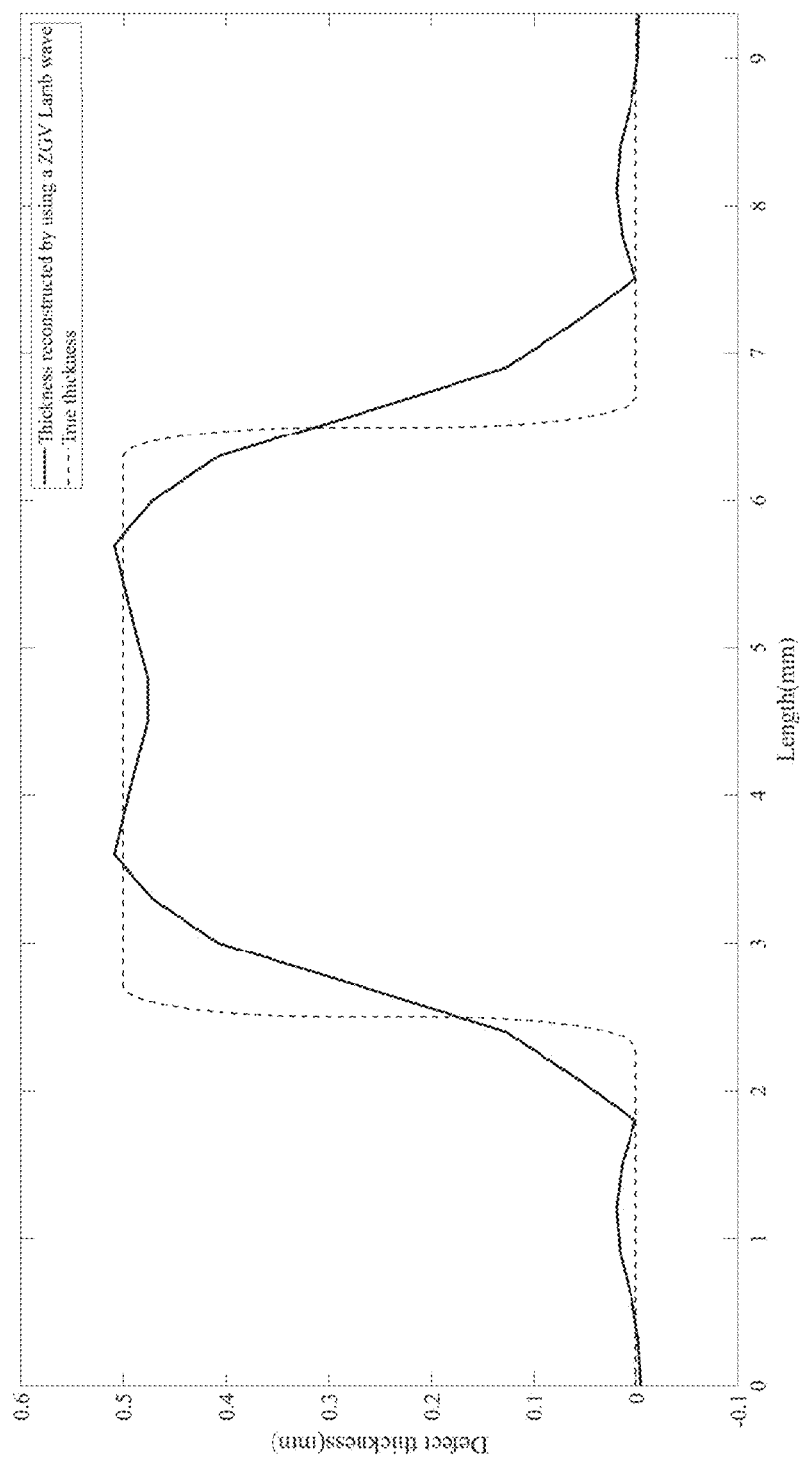
FIG. 11 shows an estimated thickness and a true thickness according to another embodiment of the present disclosure.

For each node, its thickness value is calculated and then fitted to obtain thickness information of the corrosion defect through inversion. A fitted thickness chart is shown in FIG. 11, and an inverted defect thickness value ranges from 0.476 mm to 0.508 mm, and has an error range of 1.6% to 4.8% compared with a true thickness. Therefore, it can be seen that there is only a small error between the corrosion thickness measured by the method provided in the present disclosure and the true thickness. It can be seen that the method provided in the present disclosure can invert an approximate thickness of a defect, and achieve a relatively high measurement accuracy.

Figure 12:
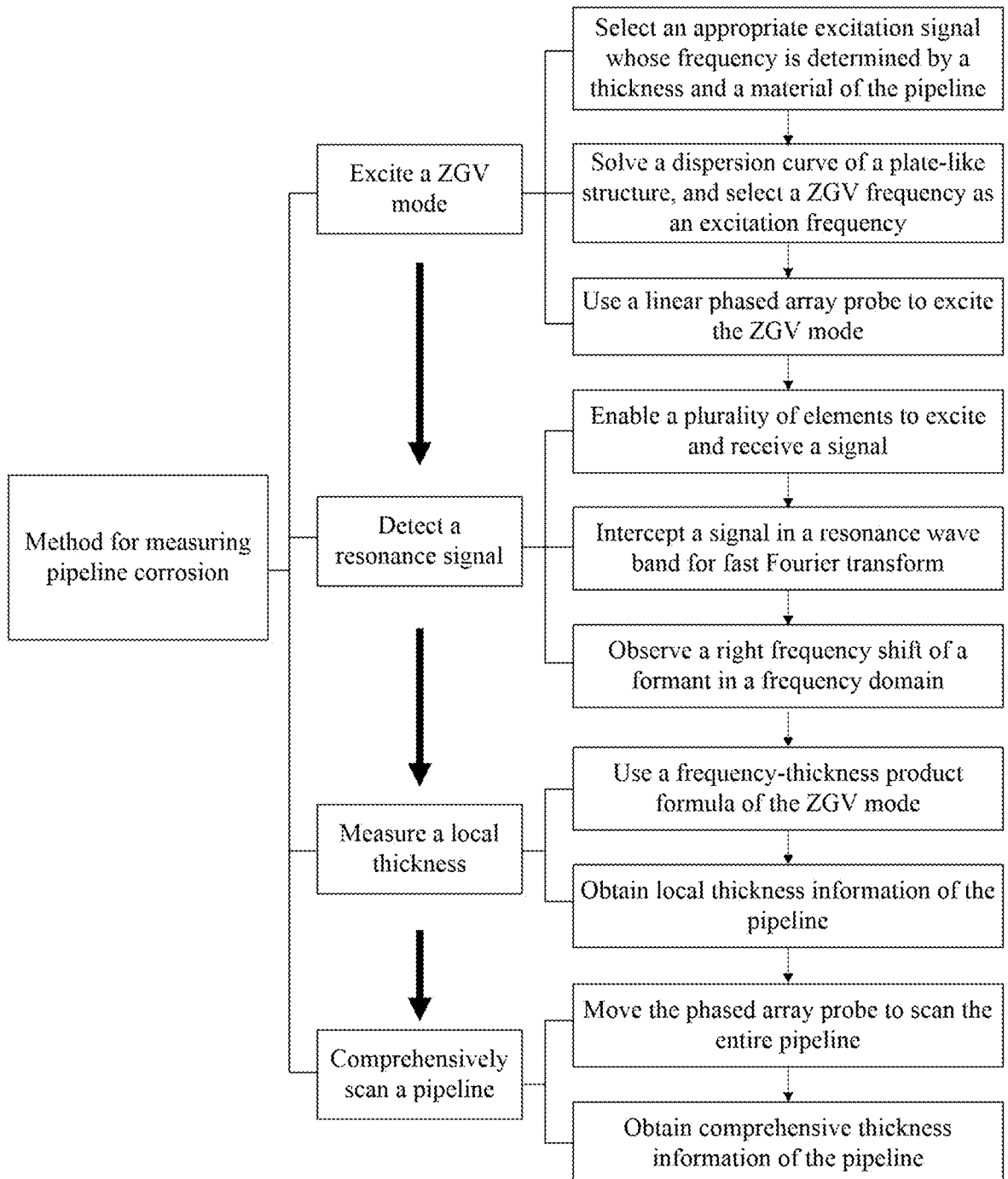
FIG. 12 is a flowchart according to an application example of the present disclosure.

In another application example, a technical process of the present disclosure in a practical application is shown in FIG. 12. The process may include: exciting a ZGV mode, detecting a resonance signal, measuring a local thickness, and comprehensively scanning a pipeline.

Specifically, in the present disclosure, since a phased array probe is used to scan only a local region on a cross-section, only a dispersion curve of a plate-like structure needs to be solved in detail, without involving a dispersion characteristic of a pipeline structure. Therefore, firstly, the present disclosure utilizes commercial software COMSOL Multiphysics to perform simulation analysis on the dispersion characteristic to determine a theoretical frequency of exciting a ZGV Lamb wave.

Secondly, after determining an excitation frequency of the ZGV mode, the present disclosure intercepts a resonance wave in a received signal and performs fast Fourier transform to observe a formant in a frequency domain, and verifies whether a center frequency of the formant is close to the theoretical frequency, thereby verifying existence of the ZGV mode in a complete plate-like structure.

Thirdly, after confirming the existence of the ZGV mode, the present disclosure sets an appropriate excitation signal and detects the pipeline by using a linear phased array probe. The linear phased array probe uses a plurality of elements to form an array, forming a waveform emitter. The waveform emitter can change a beam direction according to an instruction of a monitor, thereby achieving overall scanning of the structure. That is, the linear phased array probe controls a direction of a signal beam by controlling a phase of emitting a signal by each square matrix in the array, achieving comprehensive scanning of the pipeline.

In the present disclosure, the linear phased array probe will sequentially excite and receive a signal (self-transmission and self-reception), extract a resonance wave from a signal received by each element, and perform the fast Fourier transform. Whether there is a frequency shift in the formant is observed, a center frequency of the formant is extracted, and the extracted center frequency is compared with a frequency-thickness product of the ZGV mode in the complete plate-like structure. A frequency-thickness product formula of the ZGV mode (namely, a thickness calculation formula) is used to solve a thickness at a position of the element. Therefore, same quantity of pieces of thickness information can be obtained based on a quantity of elements. Then, an obtained thickness value is fitted to finally obtain a thickness of a region detected by the phased array probe, thereby obtaining local thickness information.

Finally, the entire pipeline can be scanned by manually or automatically moving the phased array probe. At each detection position, the above steps are performed to obtain comprehensive thickness information of the pipeline.

Therefore, the method for measuring pipeline corrosion provided in the present disclosure combines advantages of a phased-array technology and a ZGV mode to conveniently reconstruct a thickness of a pipeline and discover a corrosion defect in a timely manner to avoid an unnecessary loss.

Figure 13:
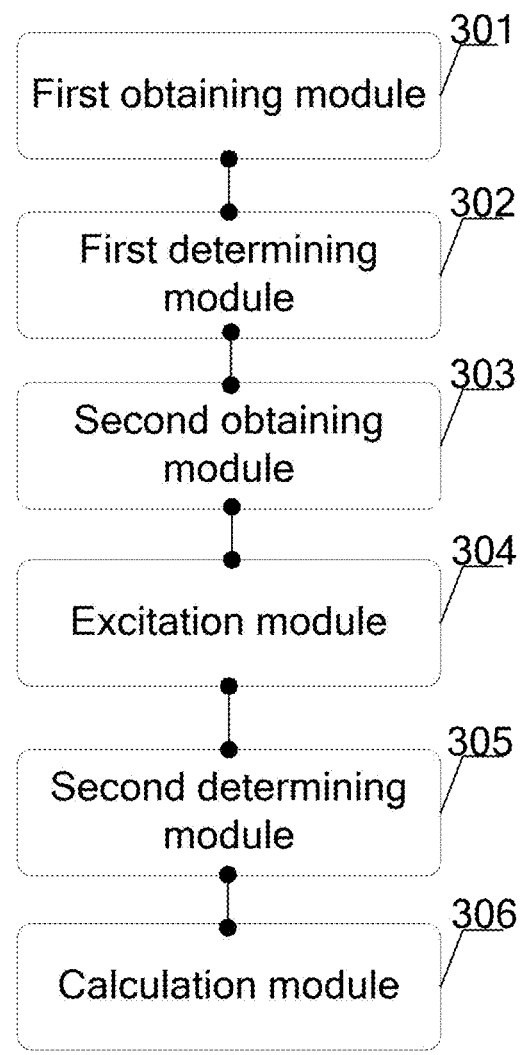
FIG. 13 is a schematic structural diagram showing a device for measuring pipeline corrosion according to an embodiment of the present disclosure.

Referring to FIG. 13, a device for measuring pipeline corrosion according to an embodiment of the present disclosure includes:
  a first obtaining module 301 configured to obtain a material property of a to-be-detected pipeline, and calculate a theoretical dispersion curve of the to-be-detected pipeline based on the material property;
  a first determining module 302 configured to determine a theoretical frequency-thickness product and a theoretical frequency of a ZGV Lamb wave mode from the theoretical dispersion curve;
  a second obtaining module 303 configured to obtain a target excitation signal corresponding to the theoretical frequency;
  an excitation module 304 configured to send the target excitation signal to the to-be-detected pipeline, and receive a target waveform, where the target waveform is obtained by reflecting the target excitation signal through to-be-detected pipeline;
  a second determining module 305 configured to determine an actual frequency of the ZGV Lamb wave mode from the target waveform; and
  a calculation module 306 configured to calculate corrosion of the to-be-detected pipeline based on the theoretical frequency-thickness product and the actual frequency of the ZGV Lamb wave mode.

In a specific embodiment, the excitation module 304 is specifically configured to use a linear phased array probe to send the target excitation signal to the to-be-detected pipeline and receive the target waveform.

The linear phased array probe is equipped with a plurality of elements, and a quantity of target waveforms is consistent with a quantity of the elements.

In a specific embodiment, the second determining module 305 is specifically configured to determine the actual frequency of the ZGV Lamb wave mode from each group of target waveforms to obtain a plurality of formant center frequencies of the ZGV Lamb wave mode.

In a specific embodiment, the calculation module 306 includes:
  a thickness value calculation subunit configured to calculate a thickness based on each of the groups of formant center frequencies of the ZGV Lamb wave mode and the theoretical frequency-thickness product to obtain a plurality of groups of thickness values; and
  a fitting subunit configured to fit the groups of thickness values to obtain the corrosion thickness of the to-be-detected pipeline.

Figure 14:
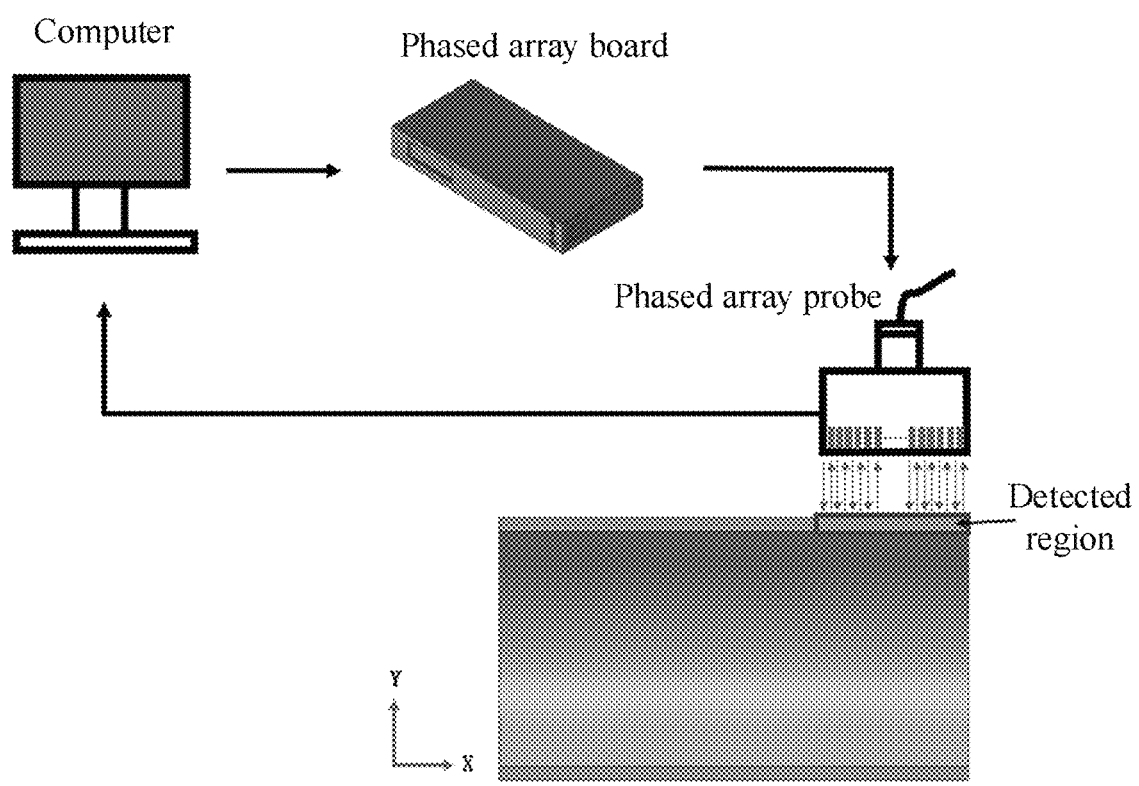
FIG. 14 is a schematic structural diagram showing a system for measuring pipeline corrosion according to an embodiment of the present disclosure.

Referring to FIG. 14, the present disclosure further provides a system for measuring pipeline corrosion, including: a linear phased array probe, a phased array board, and a controller. The phased array board is connected to the linear phased array probe, and the controller is respectively connected to the phased array board and the linear phased array probe. The system is configured to perform the method in any one of the above embodiments.

It should be noted that the controller in the embodiments may be a computer.

A person skilled in the art can clearly understand that, for convenience and brevity of description, reference may be made to corresponding processes in the foregoing method embodiments for specific working processes of the foregoing systems, devices, and units. Details are not described herein again.

In several embodiments provided in the present disclosure, it should be understood that the disclosed system, device, and method may be implemented in other manners. For example, the described device embodiments are merely schematic. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electrical, mechanical, or other forms.

The units described as separate parts may or may not be physically separate. Parts shown as units may or may not be physical units, which may be located in one position, or may be distributed on a plurality of network units. Some or all of the units may be selected according to actual requirements to achieve the objectives of the solutions in the embodiments.

In addition, functional units in the embodiments of the present disclosure may be integrated into one processing unit, or each of the functional units may exist alone physically, or two or more functional units may be integrated into one processing unit. The above integrated unit may be implemented either in a form of hardware or in a form of a software functional unit.

The integrated unit, if implemented in the form of a software functional unit and sold or used as a stand-alone product, may be stored in a computer-readable storage medium. Based on such an understanding, the technical solutions in the present disclosure essentially, or the part contributing to the prior art, or all or some of the technical solutions may be implemented in a form of a software product. The computer software product is stored in a storage medium, and includes instructions for instructing a computer device (which may be a personal computer, a server, a network device, or the like) to perform all or some of the steps of the method described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The terms "first", "second", "third", "fourth", and so on (if any) in the specification and accompanying drawings of the present disclosure are intended to distinguish between similar objects but do not necessarily indicate a specific order or sequence. It should be understood that the data used in such a way may be exchanged under proper conditions to make it possible to implement the described embodiments of the present disclosure in other sequences apart from those illustrated or described herein. Moreover, the terms "include", "have", and any other variants mean to cover the non-exclusive inclusion, for example, a process, method, system, product, or device that includes a list of steps or units is not necessarily limited to those steps or units which are clearly listed, but may include other steps or units which are not expressly listed or inherent to such a process, method, product, or device.

The foregoing embodiments are only used to explain the technical solutions of the present disclosure, and are not intended to limit the same. Although the present disclosure is described in detail with reference to the foregoing embodiments, those of ordinary skill in the art should understand that they can still modify the technical solutions described in the foregoing embodiments, or make equivalent substitutions on some technical features therein. These modifications or substitutions do not make the essence of the corresponding technical solutions deviate from the spirit and scope of the technical solutions of the embodiments of the present disclosure.

What is claimed is:

1. A method for measuring pipeline corrosion, comprising:

obtaining a material property of a to-be-detected pipeline, and calculating a theoretical dispersion curve of the to-be-detected pipeline based on the material property;

determining a theoretical frequency-thickness product and a theoretical frequency of a zero-group-velocity (ZGV) Lamb wave mode from the theoretical dispersion curve;

obtaining a target excitation signal corresponding to the theoretical frequency;

sending the target excitation signal to the to-be-detected pipeline and receiving a target waveform, wherein the target waveform is obtained by reflecting the target excitation signal through the to-be-detected pipeline;

determining an actual frequency of the ZGV Lamb wave mode from the target waveform; and calculating corrosion of the to-be-detected pipeline based on the theoretical frequency-thickness product and the actual frequency of the ZGV Lamb wave mode.

2. The method according to claim 1, wherein the sending the target excitation signal to the to-be-detected pipeline and receiving a target waveform specifically comprises:

using an element of a linear phased array probe to send the target excitation signal to the to-be-detected pipeline and receive the target waveform, wherein the linear phased array probe is equipped with a plurality of elements, and a quantity of target waveforms is consistent with a quantity of the elements.

3. The method according to claim 2, wherein the determining an actual frequency of the ZGV Lamb wave mode from the target waveform specifically comprises:

determining the actual frequency of the ZGV Lamb wave mode from each group of target waveforms to obtain a plurality of groups of formant center frequencies of the ZGV Lamb wave mode.

4. The method according to claim 3, wherein the calculating corrosion of the to-be-detected pipeline based on the theoretical frequency-thickness product and the actual frequency of the ZGV Lamb wave mode specifically comprises:

calculating a thickness based on each of the plurality of groups of formant center frequencies of the ZGV Lamb wave mode and the theoretical frequency-thickness product to obtain a plurality of groups of thickness values; and fitting the plurality of groups of thickness values to obtain the corrosion thickness of the to-be-detected pipeline.

5. The method according to claim 4, wherein a calculation formula of the thickness is as follows:

$$d_e = \frac{f_t d_t}{f_e}$$

wherein $f_t d_t$ represents the theoretical frequency-thickness product, $f_e$ represents the actual frequency of the ZGV Lamb wave mode, and $d_e$ represents the thickness value.

6. A device for measuring pipeline corrosion, comprising:

a first obtaining module configured to obtain a material property of a to-be-detected pipeline, and calculate a theoretical dispersion curve of the to-be-detected pipeline based on the material property;

a first determining module configured to determine a theoretical frequency-thickness product and a theoretical frequency of a ZGV Lamb wave mode from the theoretical dispersion curve;

a second obtaining module configured to obtain a target excitation signal corresponding to the theoretical frequency;

an excitation module configured to send the target excitation signal to the to-be-detected pipeline and receive a target waveform, wherein the target waveform is obtained by reflecting the target excitation signal through the to-be-detected pipeline;

a second determining module configured to determine an actual frequency of the ZGV Lamb wave mode from the target waveform; and a calculation module configured to calculate corrosion of the to-be-detected pipeline based on the theoretical frequency-thickness product and the actual frequency of the ZGV Lamb wave mode.

7. The device according to claim 6, wherein the excitation module is specifically configured to use an element of a linear phased array probe to send the target excitation signal to the to-be-detected pipeline and receive the target waveform, wherein the linear phased array probe is equipped with a plurality of elements, and a quantity of target waveforms is consistent with a quantity of the elements.

8. The device according to claim 7, wherein the second determining module is specifically configured to determine the actual frequency of the ZGV Lamb wave mode from each group of target waveforms to obtain a plurality of groups of formant center frequencies of the ZGV Lamb wave mode.

9. The device according to claim 8, wherein the calculation module specifically comprises:

a thickness value calculation subunit configured to calculate a thickness based on each of the plurality of groups of formant center frequencies of the ZGV Lamb wave mode and the theoretical frequency-thickness product to obtain a plurality of groups of thickness values; and a fitting subunit configured to fit the plurality of groups of thickness values to obtain the corrosion thickness of the to-be-detected pipeline.

10. A system for measuring pipeline corrosion, comprising: a linear phased array probe, a phased array board, and a controller, wherein the phased array board is connected to the linear phased array probe, and the controller is respectively connected to the phased array board and the linear phased array probe; and the system is configured to perform the method according to claim 1.

* * * * *